United States Patent
Lienemann et al.

[11] 3,757,996
[45] Sept. 11, 1973

[54] SEED CUT-OFF FOR PLANTERS

[75] Inventors: Darlo E. Lienemann, Darien; Arthur S. Datta, Willow Springs, both of Ill.

[73] Assignee: International Harvester Company, Chicago, N.Y.

[22] Filed: Aug. 9, 1971

[21] Appl. No.: 169,960

[52] U.S. Cl. ............................... 221/211, 221/251
[51] Int. Cl. ............................................. B65h 3/08
[58] Field of Search ................... 221/211, 251, 167, 221/168, 169, 170, 236, 237, 182, 159, 160, 161, 162

[56] References Cited
UNITED STATES PATENTS

| 3,637,108 | 1/1972 | Loesch et al. | 221/211 |
| 3,387,746 | 6/1968 | Whipple | 221/211 |
| 3,269,594 | 8/1966 | MacKenzie | 221/168 X |
| 2,930,509 | 3/1960 | Hall | 221/182 X |

FOREIGN PATENTS OR APPLICATIONS

| 1,214 | 5/1864 | Great Britain | 221/168 |

*Primary Examiner*—Robert B. Reeves
*Assistant Examiner*—Francis J. Bartuska
*Attorney*—Floyd B. Harman

[57] ABSTRACT

A seed dispenser for a pneumatic planter of the type wherein seed is fed to the interior of a revolving seed selector drum having peripheral seed-receiving openings. The interior of the drum is supplied with air under pressure to attract seeds to the openings and carry them upwardly to a discharge area. A cut-off means is provided within the drum ahead of the discharge area to dislodge excess seed from the openings.

8 Claims, 5 Drawing Figures

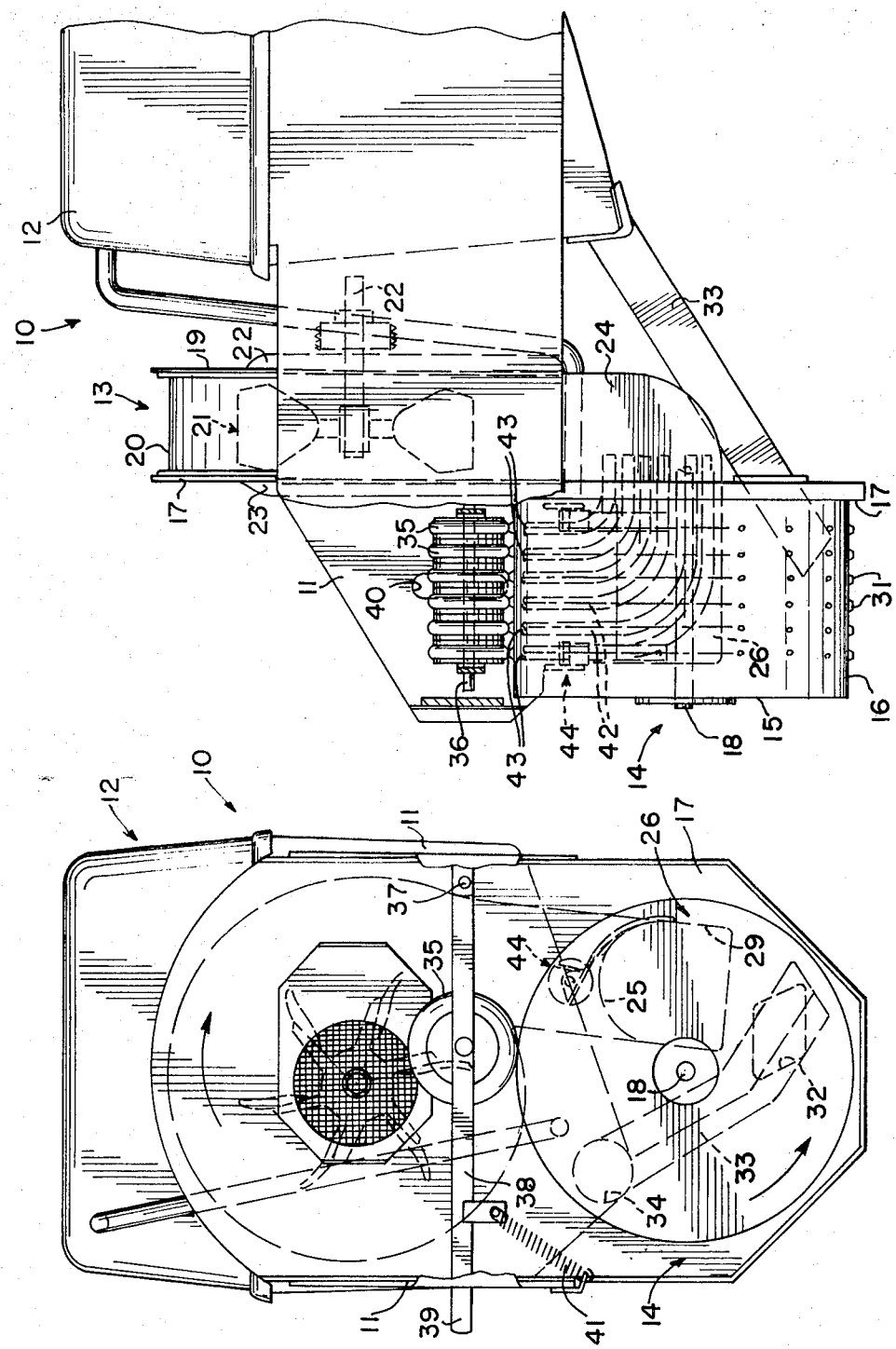

Patented Sept. 11, 1973
3,757,996
2 Sheets-Sheet 2
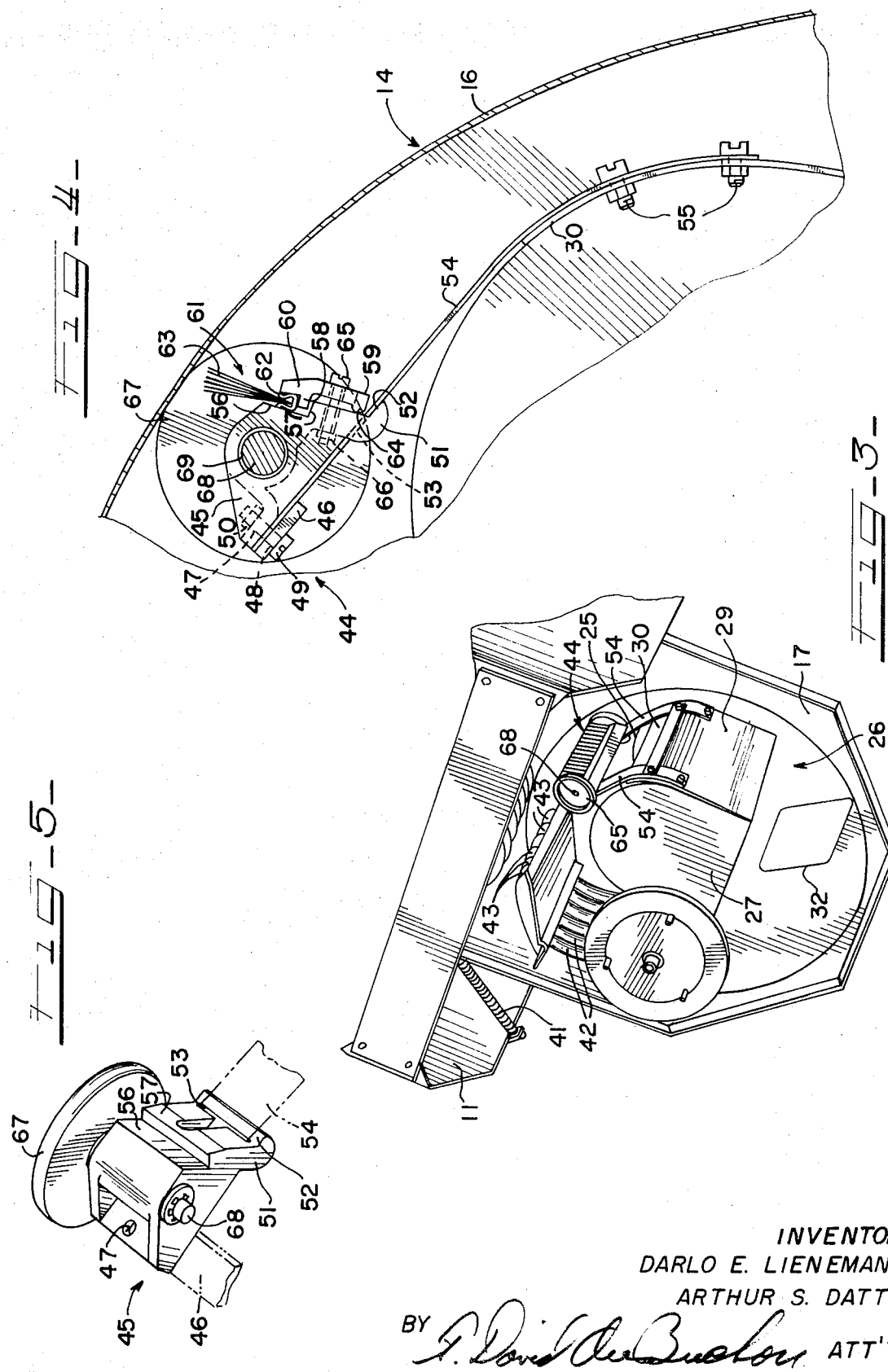
INVENTORS
DARLO E. LIENEMANN
ARTHUR S. DATTA
BY *[signature]* ATT'Y

SEED CUT-OFF FOR PLANTERS

CROSS REFERENCES TO RELATED APPLICATIONS

U.S. application to Loesch et al., Ser. No. 836,480, filed June 25, 1969 now U.S. Pat. No. 3,637,108; U.S. application to Lienemann et al., Ser. No. 146,258, filed May 24, 1971; U.S. application to Bauman, Ser. No. 162,090, filed July 13, 1971, and U.S. application to Bauman et al., Ser. No. 162,091, filed July 13, 1971.

BACKGROUND OF THE INVENTION

1. Field of the Invention

This invention relates to planters and particularly to seed dispensing means therefor. More specifically, the invention concerns a planter of the pneumatic type.

2. Description of the Prior Art

Planters of the pneumatic type utilizing air pressure differential in a rotatable seed selector to retain seed at a pickup opening by vacuum or by pressure greater than atmospheric and discharge the seed after a predetermined rotation of the selector by vacuum release or by positive air pressure, are known. Planters of this type are shown for example in the U.S. Pats. to: Dodwell, No. 2,960,258 of Nov. 15, 1960; Clow, No. 3,240,175 of Mar. 15, 1966; Winter, No. 3,142,274 of July 28, 1964; and Ferrault, No. 3,412,908 of Nov. 26, 1968. In the previously referred to Loesch et al. application, Ser. No. 836,480, pneumatic means are provided to dislodge excess seed at a location forward of the discharge area. The subject invention has been found more economical and reliable than the pneumatic means of Loesch et al.

SUMMARY

The seed dispenser mechanism with which this invention is concerned includes a seed selector drum, open at one side and rotatable against a stationary wall through openings in which seed and air under pressure are introduced into the interior of the drum. Peripheral openings in the drum receive individual seeds and hold them by the pressure differential between the inside and the outside of the drum, carrying the seeds upwardly by the rotation of the drum to an area from which the seeds are discharged from the drum to the planter furrow openers.

Where it is desired to deposit single seeds in the ground at evenly spaced intervals, only one seed should be seated in each of the peripheral openings at the time of discharge from the drum. However, since a single seed, for example corn, does not always fit the opening in such a manner as to completely close it, suction created by air under pressure escaping around the seed from the interior of the drum attracts additional seed and carries it along to the discharge area. Upon reaching the discharge area in the upper part of the drum the seeds are influenced by gravity and means are provided for closing off the openings, negativing the pressure differential and allowing the seeds to be released and blown into the open ends of tubes leading to the furrow openers.

The present invention is designed to assure the retention of a single seed in each of the openings in the periphery of the drum at the time of discharge, and has for its object the provision of a cut-off device engagable with the seed in the openings in advance of the discharge area for dislodging excess seed and returning it to the seed supply in the bottom of the drum.

Another object of the invention is to provide, in a pressurized rotatable seed selector drum having a seed supply and peripheral openings adapted to attract seed from the supply and carry it to a discharge area, a seed cut-off device including a brush disposed in the path of the seed, wherein the cut-off device also includes gauge means engageable with the inner periphery of the drum for maintaining a selected spacing between the brush and the drum.

DESCRIPTION OF THE DRAWINGS

FIG. 1 is a view in side elevation of a seed dispenser assembly embodying the features of this invention;

FIG. 2 is a rear elevation, with parts removed, of the structure shown in FIG. 1;

FIG. 3 is a perspective view of the seed selector with the drum housing removed;

FIG. 4 is an enlarged detail, partly in section, of a portion of the drum showing the mounting of the cut-off device; and FIG. 5 is an enlarged detail in plan of a portion of the cut-off device shown in FIG. 4.

DESCRIPTION OF THE PREFERRED EMBODIMENT

The seed dispenser assembly with which this invention is concerned is shown in FIG. 1 and designated by the numeral 10, and is adapted for mounting upon the frame of a planter such as is shown and described in copending U.S. application Ser. No. 146,258, referred to hereinbefore, to which reference may be had for constructional details not included herein. For the purposes of this invention it should be understood that the dispenser assembly is mounted on a pair of supporting plates 11 carried by the planter frame, and comprises a seed hopper 12, an air pump or blower 13 and a seed selector drum 14.

Drum 14 comprises a circular outer wall 15 and a peripheral cylindrical portion 16 which is rotatable against and in sealing relation to a stationary inner wall 17 which rotatably receives a shaft 18, one end of which is affixed to the outer wall 15. Shaft 18 projects through stationary wall 17 and is driven by suitable means, not shown, to revolve the drum in the direction of the arrow in FIG. 2.

Wall 17 forms one wall of blower 13, which is disposed between the drum and the hopper 12. Wall 17 is spaced from the other wall 19 of the blower by a closure 20, forming a housing enclosing a fan 21 mounted on a shaft 22 rotatably mounted on wall 19 and driven by means, not shown, in the direction of the arrow in FIG. 2. Walls 17 and 19 of the blower housing are provided, respectively, with flanges 22 and 23, by which the blower is secured to supporting plates 11.

Air under pressure generated by the blower is directed tangentially downwardly and rearwardly through a conduit 24 connected to an opening 25 in wall 17. The air under pressure discharges through opening 25 into an upwardly opening air intake member 26, best shown in FIGS. 2 and 3, having an end wall 27, a bottom wall and a side wall 29. Side wall 29 having a curved upper portion 30 that serves as a deflector plate to direct air from the blower upwardly in the direction of rotation of the drum.

As indicated in FIG. 1, circumferentially arranged rows of peripheral openings 31 are spaced axially of the drum, one for each furrow formed by the furrow openers of the planter with which the seed dispenser of this invention is associated. The peripheral openings 31 are interiorly beveled to receive seeds from a supply formed in the lower portion of the drum and delivered thereto through an opening 32 in the lower portion of wall 17 from a seed chute 33, square in cross-section, the other end of which is connected to an opening 34 in the bottom of the seed hopper 12 and indicated in FIG. 2.

Seed from the supply in the lower portion of the drum is picked up by the openings 31 during rotation of the drum and retained therein by the differential between the exterior atmospheric and the higher air pressure inside the drum. As the seeds reach the top of the drum the outer edges of the openings 31 are successively engaged by rubber tired rollers 35, one for each axially spaced series of openings. Rollers 35 are mounted on a shaft 36 rotatably supported between the sides of a fork member 38 having a handle 39. Handle 39 is slidably received in a slot 40 in one of the supporting plates 11 and suitably pivoted 37 on the other supporting plate to accommodate raising and holding the rollers 35 out of contact with the drum, by means not shown, to an inoperative position. During operation of the planter the rollers 35 are yieldably held in engagement with the outer periphery of the drum by a spring 41, shown in FIGS. 2 and 3, anchored at one end to the fork 38 and at its other end to one of the plates 11.

Air pressure differential between the inside and outside of the drum holds the seeds in the openings. As the seeds reach the peak of their rotary path, rollers 35 engage the exterior of successive openings 31 eliminating the pressure differential, releasing the seeds and allowing them to fall. Seed discharge tubes 42 having open ends 43 are located such that there is an open end 43 below each drum opening 31 as it reaches its peak. The air under pressure enters discharge tubes 42 through open ends 43 and this air flow functions to carry the falling seeds along with it into open ends 43 and through tubes 42. The lower portions of tubes 42 are directed at right angles forwardly through vertically spaced openings provided in stationary wall 17, as indicated in FIG. 1, and are connected to guide tubes, not shown, leading to the furrow openers of the planter with which the dispenser of this invention is associated.

Suction generated by air under pressure escaping around seeds which do not completely fill the openings 31 attracts additional seeds to the openings, and in order to remove the excess seed and allow only a single seed to be carried to the discharge area to be ejected from the drum through tubes 42, seed cut-off means is provided in the drum in advance of the seed discharge area and is generally designated by the numeral 44.

Cut-off means 44, best shown in FIGS. 3 and 4, is disposed axially of the drum and comprises a support including a pair of spaced brackets 45 secured to the ends of a connecting bar 46. Each of the brackets 45 has at one end an opening 47 registrable with an opening 48 in each end of the connecting bar 46 to receive a bolt 49 having a fastening nut 50. The other end of each bracket 45, as shown in FIGS. 4 and 5, has a leg portion 51 forming a transverse shoulder 52 registering with a slot 53 adapted to receive one end of a flat steel spring 54 which engages shoulder 52 and extends along the lower surface of the bracket and between the bracket and connecting bar 46 and is apertured at its end to receive the bolt 49. The other end of each of the springs 54 being anchored to the curved air deflector plate 30 by bolts 55.

Each of the end brackets 45 is recessed to provide a wall 56 and a shoulder 57 in guiding relation to a projection 58 on a clamping member 59 having an upwardly extending portion 60 forming with projection 58 and wall 56 a socket to receive the ends of a brush 61 having a channel shaped base 62 in which bristles 63, preferably of nylon or the like, are seated. A bead 64 on the lower end of clamping member 59 engages and spaces the main body of the latter from the bracket, and registering openings in the bracket and the clamping member receive a bolt 65 having a fastening nut 66 which, upon tightening, securely holds the brush.

The seed cut-off assembly 44 is yieldably biased by the action of springs 54 radially in the direction of the periphery of the drum to dispose brush 61 in operative relation to the seeds held in openings 31 to engage and sweep excess seed away from the openings. In order to maintain the selected relationship of the brush to the inner periphery of the drum, a pair of gauge rollers 67 are provided, and each roller 67 is mounted on a stub shaft 68 rotatably received in a bearing 69 formed in bracket 45. Rollers 67 revolve by frictional engagement with the inner periphery of the drum and maintain the selected spacing between bristles 63 and the drum to achieve optimum results in brushing excess seed from the openings 31, allowing the dislodged seed to return to the supply in the bottom of the drum.

The position of the cut-off brush relative to the drum periphery shown in FIG. 4 is satisfactory for seeds of a certain size range, for example, corn or comparably sized peanuts. However, should the planter operator wish to plant a smaller variety of peanuts, for example, the cut-off brush must be adjusted toward the drum periphery to achieve the best results. To accomplish this clamp 59 is loosened by relieving nut 66 on bolt 65. Brush 61 is then adjusted radially outwardly and bolt 65 again tightened to clamp brush base 62 securely in its adjusted position in its socket.

What is claimed is:

1. In a seed dispenser for planters, a stationary wall, a seed selector drum rotatably mounted on said wall and having peripheral openings therein, means for rotating said drum, means for supplying seeds to the interior of said drum, means for delivering air under pressure to the interior of said drum to attract seed to said openings by pressure differential between the interior and exterior of the drum and to carry the seed to a discharge area after a predetermined rotation of the drum, seed cut-off means in the drum, and means for mounting said cut-off means on said stationary wall in the path of the seed carried by said drum, in advance of said discharge area such that when a plurality of seeds are attracted to an opening, causing one or more of these excess seeds to protrude further from said seed selector drum then would a single seed, the excess seed are engaged and dislodged from said seed selector drum, and gauge means carried by said cut-off means, said gauge means engageable with the inner periphery of the drum to maintain the position of the cut-off means relative to said openings to engage and dislodge excess seed from said openings.

2. The invention set forth in claim 1, wherein means are provided for adjusting the position of the cut-off means relative to the gauge means to vary the position of the cut-off means relative to said openings.

3. The invention set forth in claim 2, wherein the means for mounting the cut-off means on said stationary wall includes yieldable means biasing said gauge means toward the periphery of the drum.

4. The invention set forth in claim 3, wherein said cut-off means extends transversely of the drum periphery and said gauge means comprises rollers rotatably mounted at the ends of the cut-off means and engageable with the inner periphery of the drum.

5. The invention set forth in claim 4, wherein an opening is provided in said stationary wall for directing said air under pressure to the interior of the drum, and said mounting means for the cut-off means includes a deflector plate for deflecting the air in the direction of rotation of the drum to said seed discharge area.

6. The invention set forth in claim 6, wherein said cut-off means is secured to one end of a spring steel supporting member the other end of which is affixed to said deflector plate.

7. In a seed dispenser for planters including a rotatable seed selector drum having peripheral seed-receiving openings and means for generating a pressure differential between the interior and exterior of the drum to attract seed to said openings and wherein seed held in said openings is carried to a discharge area, seed cut-off means disposed in the drum in advance of said discharge area comprising, a support, means mounting said support in the drum, and seed engaging means secured to said support in the path of and engageable with the seed carried by said drum such that when a plurality of seeds are attracted to an opening, causing one or more of these excess seeds to protrude further from said seed selector drum then would a single seed, the excess seeds are engaged and dislodged from said seed selector drum during rotation of the drum, the mounting means for said support including yieldable means biasing said support radially outwardly towards the periphery of the drum, said seed engaging means being a brush having bristles, said brush being secured to said support by clamp means frictionally holding the brush against the support and releasable to accommodate radially adjusting the brush to selected positions relative to the periphery of the drum and gauge means maintained on said support and engageable with the inner periphery of the drum to maintain a selected position of the brush relative to the periphery of the drum.

8. The invention set forth in claim 7, wherein said gauge means comprises a pair of rollers rotatably mounted on said support.

* * * * *